United States Patent
Ko

(10) Patent No.: US 6,606,766 B2
(45) Date of Patent: Aug. 19, 2003

(54) CLIP FOR MOUNTING ARTICLE

(75) Inventor: Cheol-gyu Ko, Asan (KR)

(73) Assignee: Han Il E HWA Co., Ltd., Seoul (KR)

( * ) Notice: Subject to any disclaimer, the term of this patent is extended or adjusted under 35 U.S.C. 154(b) by 0 days.

(21) Appl. No.: 10/062,782

(22) Filed: Jan. 31, 2002

(65) Prior Publication Data

US 2002/0100146 A1 Aug. 1, 2002

(30) Foreign Application Priority Data

Feb. 1, 2001 (KR) .......................................... 2001-4753
Jan. 11, 2002 (KR) .......................................... 2002-1717

(51) Int. Cl.[7] .......................... A44B 17/00; F16B 21/00; B60R 13/02
(52) U.S. Cl. .............................. 24/295; 24/293; 24/297; 296/37.7; 296/214; 411/508
(58) Field of Search ........................ 24/295, 292, 293, 24/289, 297, 458; 411/508; 296/214, 37.7, 97.9

(56) References Cited

U.S. PATENT DOCUMENTS

| 2,598,776 | A | * | 6/1952 | Flora | 24/293 |
|---|---|---|---|---|---|
| 3,137,372 | A | * | 6/1964 | Nash | 411/508 |
| 5,186,517 | A | | 2/1993 | Gilmore et al. | |
| 5,636,891 | A | | 6/1997 | Van Order et al. | |
| 5,857,735 | A | | 1/1999 | Alonso Cuesta | |
| 5,966,782 | A | * | 10/1999 | Ishihara et al. | 24/297 |
| 6,141,837 | A | * | 11/2000 | Wisniewski | 24/295 |
| 6,179,366 | B1 | | 1/2001 | Hansz | |
| 6,322,126 | B1 | * | 11/2001 | Kraus | 296/97.9 |
| 6,353,981 | B1 | * | 3/2002 | Smith | 24/295 |
| 6,454,507 | B1 | * | 9/2002 | Romero Magarino | 411/508 |

FOREIGN PATENT DOCUMENTS

| WO | 99/21729 | 10/1998 |
|---|---|---|
| WO | 98/48179 | 5/1999 |

* cited by examiner

*Primary Examiner*—Victor Sakran
(74) *Attorney, Agent, or Firm*—J.C. Patents

(57) ABSTRACT

Disclosed is a clip for mounting an article, comprising a base member being of a plate shape and having a through hole thereon; a pair of flanges extended from opposite ends of the base member in a direction perpendicular to a lengthwise direction of the base member; a pair of insertion parts extended from opposite sides of the base member and bent upwardly to be in contact with each other; and a pair of anchoring plates which are downwardly cut from the center area of each insertion part, are projected outwardly, are elastically deformable, and have a stepped part formed with inward and outward bent parts at a free end of each anchoring plate. With this configuration, the present invention provides a clip for firmly and easily mounting article on a support structure and for easily separating the article from the support structure.

5 Claims, 5 Drawing Sheets

CLIP FOR MOUNTING ARTICLE

CROSS-REFERENCE TO RELATED APPLICATION

This application claims the priority benefit of Korean applications serial nos. 2001-4753 filed on Feb. 1, 2001, and 2002-1717, filed Jan. 11, 2002.

BACKGROUND OF THE INVENTION

1. Field of the Invention

The present invention relates in general to a clip for mounting an article, for example, mounting a sun visor inside a car.

2. Description of the Related Art

Generally, inside of a car are mounted various accessories or parts such as a sun visor assembly, an assist grip, an interior lamp, etc.

FIG. 5 representatively shows a sun visor assembly. As shown in FIG. 5, the sun visor assembly 131 is conventionally mounted on a ceiling board 125 and a supporting frame 123 by combining the ceiling board 125 with the supporting frame 123 joined to a main frame 121 and by fastening a pivot arm cover 127 combined to the sun visor assembly 131 to the ceiling board 125 and the supporting frame 123 with bolts 133. Thus, because the sun visor assembly is mounted on the ceiling board 125 and the supporting frame 123 by means of the bolts 133, the mounting work is complicated and requires much time, thereby decreasing the productivity thereof.

Therefore, there have been proposed fasteners or clips for easily mounting an article on a support structure in U.S. Pat. Nos. 5,186,517, 5,857,735, etc.

In U.S. Pat. No. 5,186,517, a support structure has a narrow slot and a wide slot communicating with the narrow slot, and a fastener is fastened to and released from the support structure by moving along the narrow slot and the wide slot. That is, the fastener is fastened to the support structure by moving to the narrow slot, and is released from the support structure by moving to the wide slot, so that the fastener enables an article equipped with the fastener to be mounted on the support structure.

However, the fastener according to U.S. Pat. No. 5,186,517 requires much material because of a long body and is likely to be released from the support structure while moving toward the wide slot.

In U.S. Pat. No. 5,857,735, a clip has two elastic anchoring wings bent upwardly from a base plate at a predetermined angle. Thus, the clip is anchored to a support structure by means of two elastic anchoring wings, so that the clip enables an article equipped with the clip to be mounted on the support structure.

However, the clip according to U.S. Pat. No. 5,857,735 is easy to be fastened to the support structure but difficult to be released from the support structure.

SUMMARY OF THE INVENTION

Accordingly, the present invention has been made keeping in mind the above-described shortcomings and user's need, and an object of the present invention is to provide a clip for firmly and easily mounting an article on a support structure and for easily separating the article from the support structure.

This and other objects of the present invention may be accomplished by the provision of a clip for mounting an article, comprising a base member being of a plate shape and having a through hole thereon; a pair of flanges extended from opposite ends of the base member in a direction perpendicular to a lengthwise direction of the base member; a pair of insertion parts extended from opposite sides of the base member and bent upwardly to be in contact with each other; and a pair of anchoring plates which are downwardly cut from the center area of each insertion part, are projected outwardly, are elastically deformable, and have a stepped part formed with inward and outward bent parts at a free end of each anchoring plate.

Herein, each anchoring plate includes a pair of wings protruded from the sides of the free end thereof, thereby preventing the clip from moving in an opposite direction to a coupling direction.

Further, end of each wing is approximately equal to a juncture of the inward and outward bent parts of the stepped part in height, so that the stepped parts of the anchoring plates and the ends of the wings are together anchored to the support structure when the clip is fastened to the support structure, thereby firmly fastening the clip to the support structure.

Further, each flange has at least one projection protruded from the surface thereof, so that the projections prevent the surface of the flanges from being in contact with a support structure to which the clip is coupled, thereby creating a gap between the support structure and the flanges of the clip. Therefore, the flanges of the clip are prevented from being in excessive contact with the support structure when the clip is coupled to the support structure, and are easily separated from the support structure when the clip is detached from the support structure.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

The present invention will be described in more detail with reference to the accompanying drawings.

Figure 1:
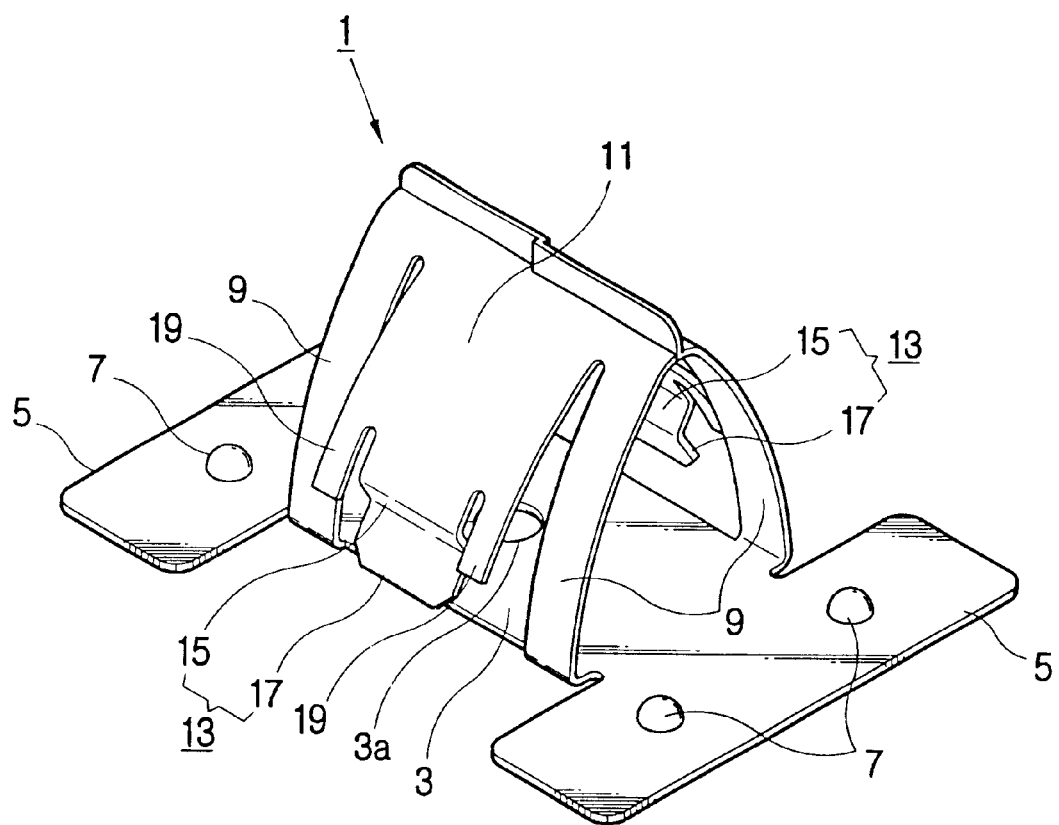
FIG. 1 is a perspective view of a clip for mounting article according to the present invention.

As shown in FIG. 1, a clip 1 for mounting article comprises a base member 3 having a plate shape, a pair of flanges 5 extended from opposite ends of the base member 3 in a direction perpendicular to a lengthwise direction of the base member 3, a pair of insertion parts 9 extended from opposite sides of the base member 3 and bent upwardly to be in contact with each other at a predetermined height, and a pair of anchoring plates 11 which are each partially cut from the center area of each insertion part 9, projected outwardly, elastically deformable, and each have a stepped part 13 at a free end portion of each anchoring plate 11.

At the center of the base member 3 is provided a screw hole 3a for being combined to the article. The screw hole 3a is formed with a screw thread mating with a screw thread of a bolt combining the article with the clip 1.

Each flange 5 has a pair of projections 7 protruded from the surface thereof. Each projection 7 is of a hemisphere shape. The projections 7 prevent the surface of the flanges 5 from being in contact with a support structure to which the clip 1 is coupled, thereby creating a gap between the support structure and the flanges 5 of the clip 1. Therefore, the flanges 5 of the clip 1 are prevented from being in excessive contact with the support structure when the clip 1 is coupled to the support structure, and are easily separated from the support structure when the clip 1 is detached from the support structure.

Each anchoring plate 11 is downwardly cut from the upper part of each insertion part 9. The stepped part 13 of the anchoring plate 11 is comprised of an inward bent part 15 bent inwardly, and an outward bent part 17 bent outwardly from the inward bent part 15. Further, at the sides of the free end of each anchoring plate 11 are provided a pair of wings 19. The distances between the opposite stepped parts 13 and between the opposite pair of wings 19 are wider than the maximum distance between the opposite insertion parts 9. Further, the end of each wing 19 is approximately equal to the juncture of the inward and the outward bent parts 15 and 17 of the stepped part 13 in height (refer to FIG. 4). Thus, the stepped parts 13 of the anchoring plates 11 and the ends of the wings 19 are together anchored to the support structure when the clip 1 is fastened to the support structure, so that the clip 1 is firmly fastened to the support structure (refer to FIG. 4). Herein, the clip 1 may be fastened to the support structure by means of only the stepped parts 13 of the anchoring plate 11, without the wings 19.

Figure 2:
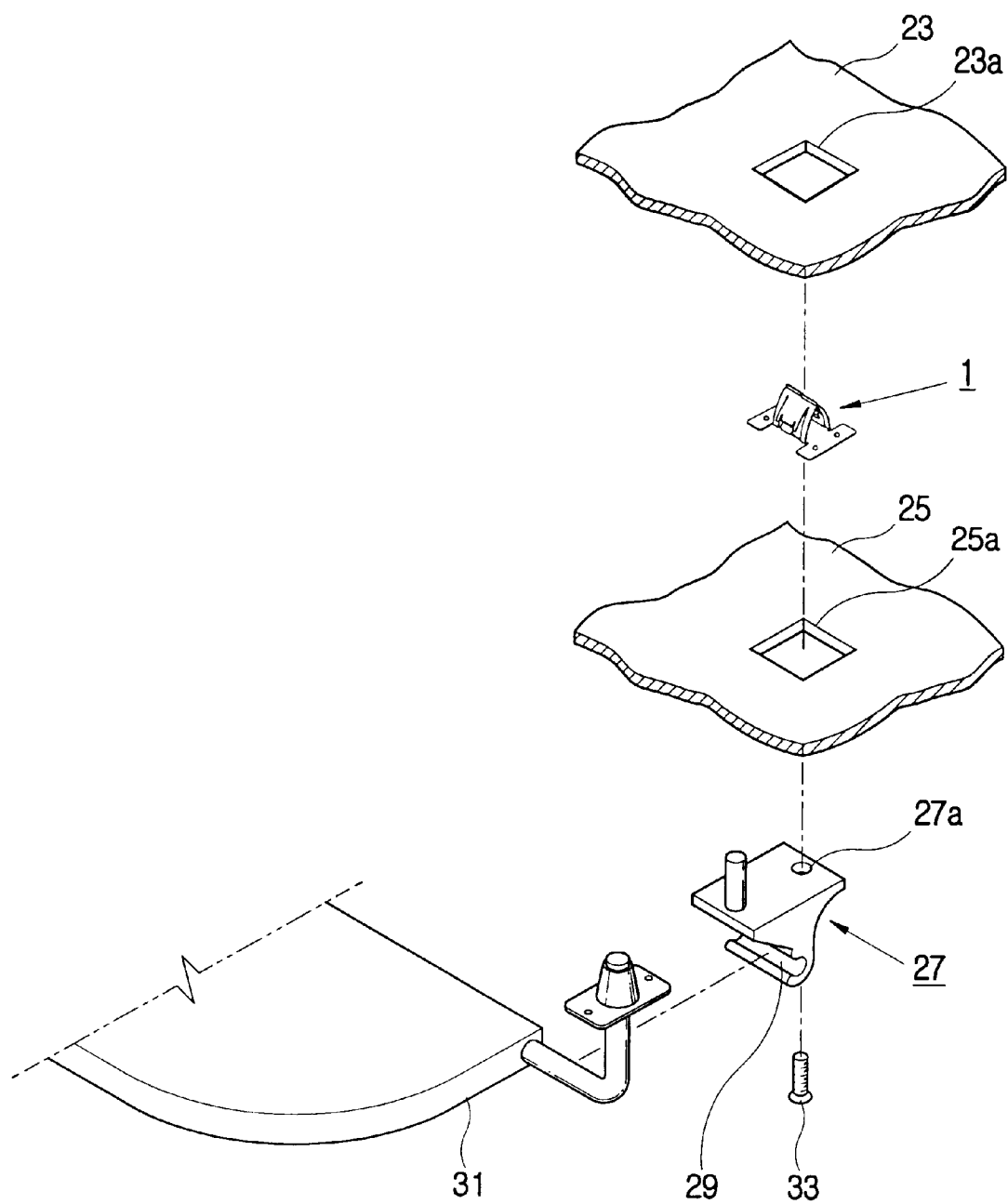
FIG. 2 is an exploded perspective view showing a sun visor assembly, in which the clip of FIG. 1 according to the present invention is inserted.
Figure 3:
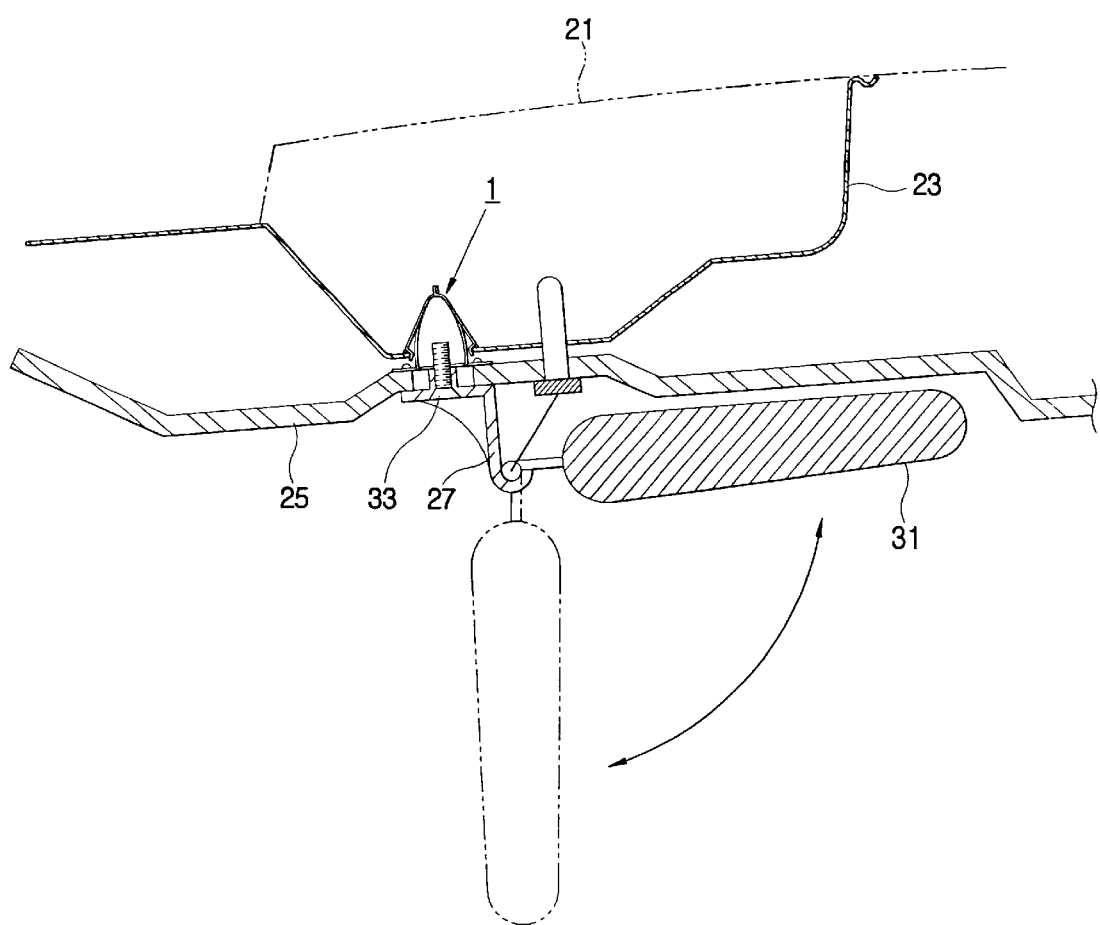
FIG. 3 is a sectional view of the clip of FIG. 2.
Figure 4:
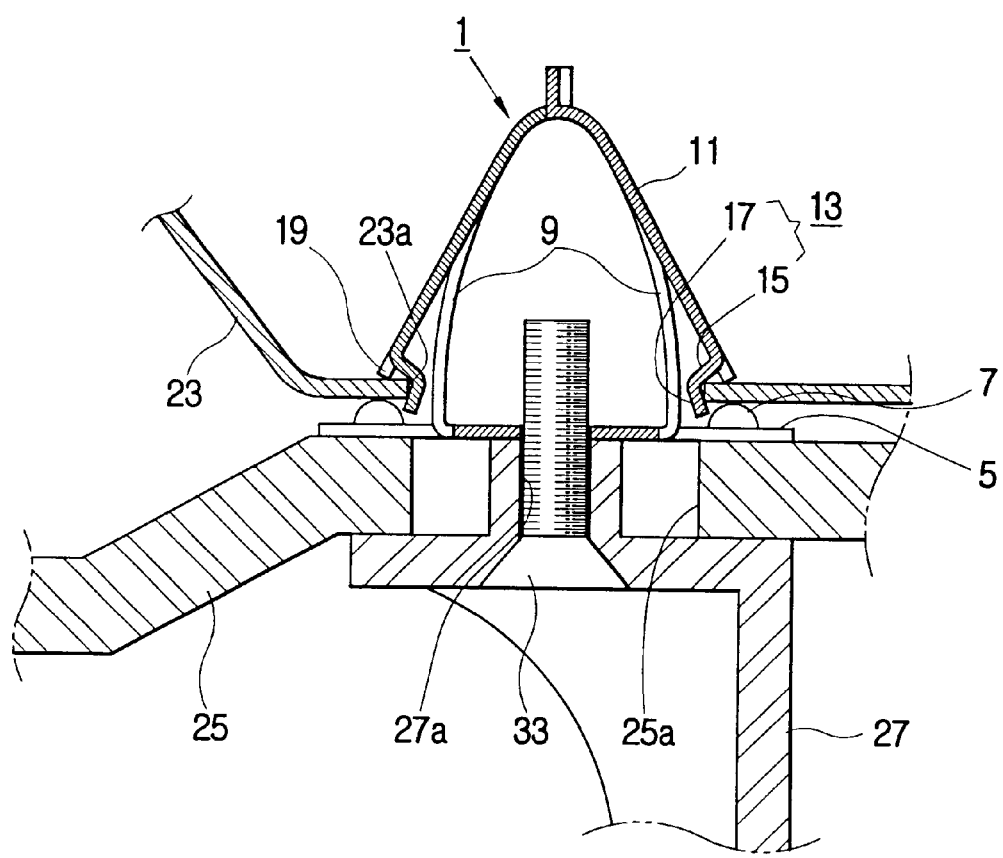
FIG. 4 is an enlarged view of the clip of FIG. 3.
Figure 5:
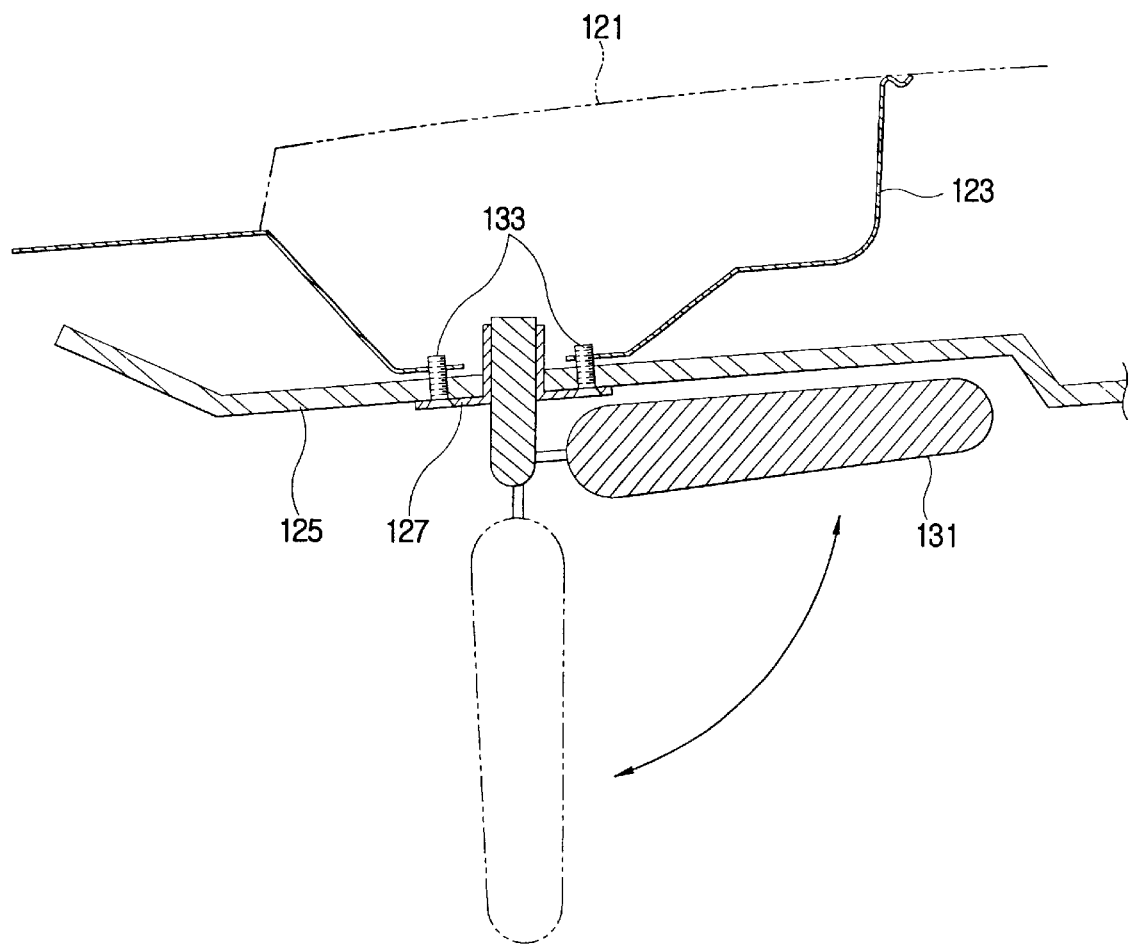
FIG. 5 is a sectional view showing a conventional mounting state of a sun visor assembly.

Hereinbelow, as an application of the clip 1 according to the present invention, a sun visor assembly mounted on the interior of a car will be described referring to FIGS. 2 through 4.

As shown therein, the clip 1 according to the present invention is coupled to a supporting frame 23 which connects a main frame 21 with a ceiling board 25 forming the interior to form a predetermined space therebetween. In the supporting frame 23 is provided a clip accommodating hole 23*a* to which the insertion parts 9 of the clip 1 are inserted and the stepped parts 13 of the anchoring plates 11 are elastically anchored. The width of the clip accommodating hole 23*a* is wider than the distance between the opposite insertion parts 9, and is narrower than the distances between the opposite stepped parts 13 and between the opposite pair of wings 19.

To the lower surface of the clip 1 is combined the ceiling board 25. That is, the bottom surfaces of the flanges 5 are in contact with the upper surface of the ceiling board 25. On the ceiling board 25 is provided a clip through hole 25*a*, through which a combining means to be described later is passed, corresponding to the clip accommodating hole 25*a*.

To the lower surface of the ceiling board 25 is combined a retainer 27. On the retainer 27 is provided a combining hole 27*a* to which the combining means is combined. Further, at one end of the retainer 27 is provided a supporting part 29 for supporting a sun visor assembly 31.

Here, a bolt 33 is employed as the combining means for combining the clip 1 with the retainer 27. Alternatively, a pin or a rivet instead of the bolt 33 may be employed as the combining means.

With this configuration, in order to mount the sun visor assembly 31 on the interior of a car, the sun visor assembly 31 is firstly combined to the supporting part 29 of the retainer 27.

Then, the bottom surface of the clip 1 and the top surface of the retainer 27 are put on the upper and lower surfaces of the ceiling board 25, respectively, in the state that the screw hole 3*a* of the clip 1 and the combining hole 27*a* of the retainer 27 face each other across the clip through hole 25*a* of the ceiling board 25. Then, the screw hole 3*a* of the clip 1 and the combining hole 27*a* of the retainer 27 are together coupled with the bolt 33, thereby combining the retainer 27 with the clip 1 across the ceiling board 25. Thus, the sun visor assembly 31 is mounted on the ceiling board 25.

Subsequently, the clip 1 fastened to the ceiling board 25 is inserted into the clip accommodating hole 23*a* of the supporting frame 23. When the clip 1 is inserted into the clip accommodating hole 23*a*, the anchoring plates 11 are inserted into the clip accommodating hole 23*a*, being elastically deformed inwardly, and anchored to opposite edges of the clip accommodating hole 23*a* by means of the outward bent parts 17 of the stepped parts 13 thereof, being elastically restored outwardly, because the width of the clip accommodating hole 23*a* is narrower than the distances between the opposite stepped parts 13 of the anchoring plates 11 and between the opposite pair of wings 19 of the anchoring plates 11. Further, the wings 19 of the anchoring plates 11 support the upper surface of the supporting frame 23, thereby preventing the clip 1 from being separated from the clip accommodating hole 23*a* even if a moving car is jolted on an unpaved road. Therefore, the clip 1 is firmly fastened in the clip accommodating hole 23*a* of the supporting frame 23. Further, the projections 7 provided on the flanges 5 of the clip 1 form a predetermined space between the lower surface of the supporting frame 23 and the upper surfaces of the flanges 5, thereby preventing the flanges 5 from being in excessive contact with the supporting frame 5 and allowing the clip 1 to be easily separated from the supporting frame 23.

Therefore, the sun visor assembly 31 is firmly and easily mounted on the ceiling board 25 and the supporting frame 23 by inserting the clip 1 combined to the retainer 27 across the ceiling board 25 into the clip accommodating hole 23*a*.

As described above, a clip having an elastic anchoring plate formed with a stepped part is inserted into a clip accommodating hole provided on a support structure, thereby allowing article combined with the clip not only to be firmly and easily mounted on the support structure but also to be easily separated from the support structure.

In the above embodiment, the clip 1 is applied to the sun visor assembly 31 to the ceiling board 25 and the supporting frame 23. However, the clip 1 can be applied not only to other car accessories or parts such as an assist grip, an interior lamp, etc. but also to article of another industry fields.

As described above, the present invention provides a clip for firmly and easily mounting article on a support structure and for easily separating the article from the support structure.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A clip for mounting an article, comprising:
   a base member being of a plate shape and having a through hole thereon;
   a pair of flanges extended from opposite ends of the base member in a direction perpendicular to a lengthwise direction of the base member;

a pair of insertion parts extended from opposite sides of the base member and bent upwardly to be in contact with each other; and a pair of anchoring plates which are downwardly cut from the center area of each insertion part, are projected outwardly, are elastically deformable, and have a stepped part formed with inward and outward bent parts at a free end of each anchoring plate, wherein each anchoring plate includes a pair of wings protruded from the sides of the free end thereof.

2. The clip according to claim 1, wherein end of each wing is approximately equal to a juncture of the inward and outward bent parts of the stepped part in height.

3. The clip according to claim 1, wherein each flange has at least one projection protruded from the surface thereof.

4. The clip according to claim 1, wherein each flange has at least one projection protruded from the surface thereof.

5. The clip according to claim 2, wherein each flange has at least one projection protruded from the surface thereof.

* * * * *